(12) United States Patent
Lyle et al.

(10) Patent No.: US 9,087,087 B2
(45) Date of Patent: Jul. 21, 2015

(54) PERFORMING INDEX SCANS IN A DATABASE

(75) Inventors: Robert W. Lyle, Morgan Hill, CA (US); Ping Wang, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 382 days.

(21) Appl. No.: 13/224,623

(22) Filed: Sep. 2, 2011

(65) Prior Publication Data

US 2013/0060781 A1 Mar. 7, 2013

(51) Int. Cl.
*G06F 17/30* (2006.01)

(52) U.S. Cl.
CPC ................ *G06F 17/30306* (2013.01)

(58) Field of Classification Search
USPC ......................................................... 707/741
See application file for complete search history.

(56) References Cited

U.S. PATENT DOCUMENTS

| | | | |
|---|---|---|---|
| 5,822,749 A * | 10/1998 | Agarwal ................................ | 1/1 |
| 6,003,022 A * | 12/1999 | Eberhard et al. ...................... | 1/1 |
| 6,343,293 B1 * | 1/2002 | Lyle ...................................... | 1/1 |
| 6,385,641 B1 | 5/2002 | Jiang et al. | |
| 6,470,330 B1 * | 10/2002 | Das et al. ...................... | 707/718 |
| 6,470,359 B1 * | 10/2002 | Lyle ...................................... | 1/1 |
| 6,604,102 B2 * | 8/2003 | Klein et al. ............................ | 1/1 |
| 6,606,617 B1 * | 8/2003 | Bonner et al. ......................... | 1/1 |
| 6,633,968 B2 * | 10/2003 | Zwiegincew et al. ......... | 711/213 |
| 6,772,179 B2 * | 8/2004 | Chen et al. ............................ | 1/1 |
| 7,359,890 B1 * | 4/2008 | Ku et al. ................................ | 1/1 |
| 7,529,891 B2 | 5/2009 | Thekkath et al. | |
| 7,693,816 B2 | 4/2010 | Nemoto et al. | |
| 7,921,117 B2 | 4/2011 | Saxena | |
| 7,925,865 B2 | 4/2011 | Chou et al. | |
| 2003/0126116 A1 * | 7/2003 | Chen et al. ......................... | 707/3 |
| 2005/0131853 A1 * | 6/2005 | Sampath et al. .................. | 707/1 |
| 2006/0212658 A1 * | 9/2006 | Hrle et al. ...................... | 711/137 |
| 2006/0294316 A1 | 12/2006 | Ho | |
| 2008/0155226 A1 | 6/2008 | Davis et al. | |
| 2009/0198738 A1 * | 8/2009 | Berger et al. .................. | 707/200 |
| 2009/0327274 A1 | 12/2009 | Kejariwal et al. | |
| 2010/0198806 A1 * | 8/2010 | Graefe et al. .................. | 707/713 |

OTHER PUBLICATIONS

IBM et al.; "Dynmaic and Autonomic Prefetch to Improve I/O and CPU Performance of SQL Calls", IPCOM000135391D, Apr. 12, 2006.

(Continued)

*Primary Examiner* — Shyue Jiunn Hwa

(74) *Attorney, Agent, or Firm* — Mollborn Patents, Inc.; Fredrik Mollborn

(57) ABSTRACT

Methods and apparatus, including computer program products, implementing and using techniques for performing an index scan in a database system. A sequence of pages visited during an index scan are dynamically tracked. The tracking includes tracking the number of page accesses requiring a wait for input or output. It is determined whether prefetching of an object is desirable. The determination being made at least in part based on the number of page accesses requiring a wait for input or output. If prefetching is desirable, a prefetching method is selected among a set of available prefetching methods. An effectiveness of the selected prefetching method is continuously monitored by tracking the sequence of pages accessed and available access methods. A different prefetching method is selected from the set of available prefetching methods if the different prefetching method has a better effectiveness for a portion of the index that is being scanned.

12 Claims, 2 Drawing Sheets

(56) References Cited

OTHER PUBLICATIONS

IBM et al.; "Buffer Replacement/Prefetching Scheme for Use in Index Scans", IPCOM000100290D, Mar. 1, 1990.

Doshi et al.; "A Strategy Selection Framework for Adaptive Prefetching in Data Visualization", 15th International Conference on, Jul. 9-11, 2003, pp. 107-116.

Saavedra et al.; "Improving the Effectiveness of Software Prefetching with Adaptive Execution", Proceedings of the 1996 Conference on, Oct. 1996, pp. 68-78.

Zhang et al.; "Accelerating and Adapting Precomputation Threads for Effcient Prefetching", IEEE 13th International Symposium on, Feb. 10-14, 2007, pp. 85-95.

* cited by examiner

PERFORMING INDEX SCANS IN A DATABASE

BACKGROUND

The present invention relates to databases, and more specifically, to performing index scans in databases. A database index is a data structure that improves the speed of data retrieval operations on a database table, at the cost of slower writes and increased storage space. Indexes can be created using one or more columns of a database table, providing the basis for both rapid random lookups and efficient access of ordered records. The disk space required to store the index is typically less than that required by the table (since indices usually contain only the key-fields according to which the table is to be arranged, and exclude all the other details in the table), yielding the possibility to store indices in memory for a table whose data is too large to store in memory.

If no index exists on a table, a table scan must be performed for each table referenced in a database query. The larger the table, the longer a table scan takes because a table scan requires each table row to be accessed sequentially. Although a table scan might be more efficient for a complex query that requires most of the rows in a table, for a query that returns only some table rows an index scan can access table rows more efficiently. Typically an optimizer of the database system determines to perform an index scan if the index columns are referenced in the SELECT statement and if the optimizer estimates that an index scan will be faster than a table scan. Index files generally are smaller and require less time to read than an entire table, particularly as tables grow larger. In addition, the entire index may not need to be scanned. The predicates that are applied to the index reduce the number of rows to be read from the data pages.

The performance of index scan methods is very sensitive to the synchronous input/output operations (I/Os) that occur during the scans. As a result, there are many approaches to prefetching the required pages into the bufferpool before the scanning transaction needs them, such that synchronous waits for the I/O to complete can be avoided.

Some of the existing prefetching methods include sequential prefetching and index non-leaf to leaf prefetching. In sequential prefetching, ranges of pages are read into the bufferpool. Thus, the sequential prefetching method is dependent upon the leaves of the index being well clustered. In the index non-leaf to leaf prefetching method, the non-leaf page in the index is used to prefetch only the leaves that are needed for an index scan. While there are several methods to prefetching pages, the decision of which prefetching method to use is typically done at bind time (that is, query compilation time), or at run time, based solely upon whether sequences of pages are (mostly) in clustering order. This is also referred to as dynamic prefetching.

However, there are some cases where these traditional prefetching methods fall short. One such case is when sequential prefetching is chosen at query compilation time, but the clustering of the object changes so that a sequential prefetching is no longer beneficial, for example, when the index leaf pages become unclustered as a result of insert and delete activity. Dynamic prefetching attempts to remedy this, but unfortunately the dynamic prefetching only detects when the pages are in near sequential order so that sequential prefetching can be used. With the advent of newer prefetching mechanisms, it becomes desirable to have more elaborate detection methods to determine when prefetching is desirable, and which methods to use. Additionally, it becomes desirable to have methods that adjust to changing conditions within an index, as it is very common for the clustering and bufferpool residency characteristics of an index to change throughout the index.

SUMMARY

According to one embodiment of the present invention, methods, apparatus and systems, including computer program products, are provided for performing an index scan in a database system. A sequence of pages visited during an index scan is dynamically tracked. The tracking includes tracking the number of page accesses requiring a wait for input or output. It is determined whether prefetching of an object is desirable. The determination being made at least in part based on the number of page accesses requiring a wait for input or output. If prefetching is desirable, a prefetching method is selected among a set of available prefetching methods. An effectiveness of the selected prefetching method is continuously monitored by tracking the sequence of pages accessed and available access methods. A different prefetching method is selected from the set of available prefetching methods if the different prefetching method has a better effectiveness for a portion of the index that is being scanned. The details of one or more embodiments of the invention are set forth in the accompanying drawings and the description below. Other features and advantages of the invention will be apparent from the description and drawings, and from the claims.

DESCRIPTION OF DRAWINGS

Like reference symbols in the various drawings indicate like elements.

DETAILED DESCRIPTION

Figure 1:
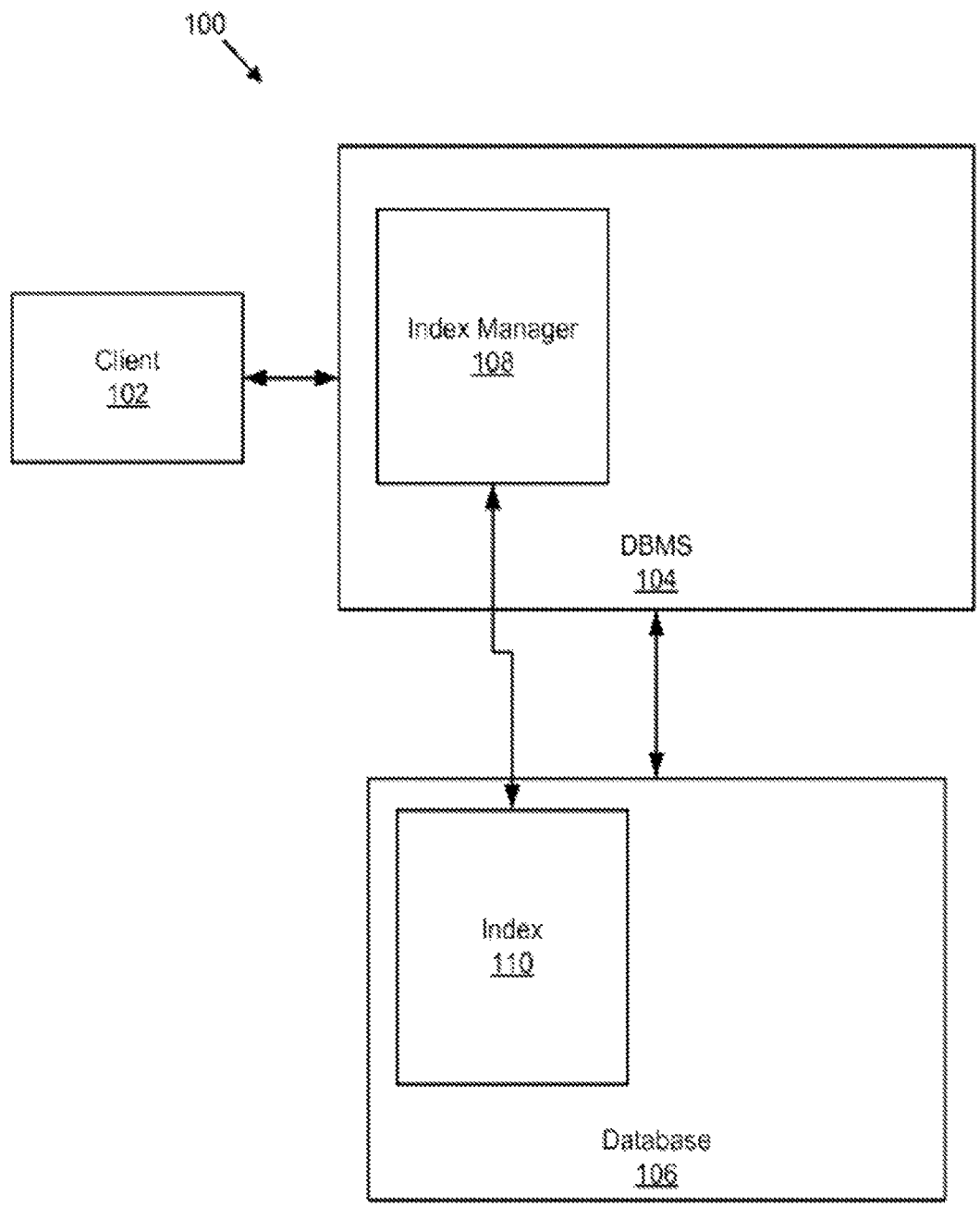
FIG. 1 shows a schematic diagram of a database system, in accordance with one embodiment.

The various embodiments of the invention described herein provide better methods for tracking the I/O behavior of a particular index scan, which allows the index scan to dynamically adjust its prefetching methods to best match the clustering and bufferpool residency of the particular portion of the index tree. In one embodiment, an index scan can analyze how many I/Os it is encountering, as well as the actual page ordering of the pages being accessed, in order to choose a prefetching method that best suits the data being scanned. As will be described in further detail below, in addition, it is possible for a scanning agent to determine when the method of prefetching (i.e. sequential, non-leaf→leaf, list, or none) is not optimal and adjust to dynamically select a method that is more suitable for the clustering and bufferpool residency characteristics of the current portion of the index tree. In this way, a particular index scan can dynamically adjust to the varied index conditions, even within an index tree.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It should be noted that the various embodiments described herein are described by way of example and with reference to index scans, where prefetching is performed on the leaf portion of the index tree. In some embodiments, prefetching leaf pages can also include pulling child page pointers from the index level immediately above the leaf level. This can also be extended to higher levels of the index tree, for example, if a leaf is at level 1 of a tree, and a parent of the leaf is at level 2, then it is possible to use child pointers from level 3 to prefetch level 2 etc., which is generally referred to herein as "index parent non-leaf to index child non-leaf prefetching."

Furthermore, as the skilled person realizes, the concepts described herein can also be generalized to index→data scans. An index→data scan refers to a scan where the index is visited and a rid (Record ID, i.e., a pointer to data row) is used to access a data row, that is, the ridlist contains the page numbers that the user wishes to access. Thus, the index→data scan can be viewed as an extension of the above scan, but where the prefetching is being done from level 1 of the index tree to the actual data pages. This can occur repeatedly during a scan of an index.

Similar concepts can also be applied to ridlist scans from index to data. A ridlist scan is similar to an index→data scan, but instead of going back and forth between the index and the data, the ridlist scan reads a range of the index and collects all the rids, typically sorts them, and then accesses the data rows. In such cases, even more optimizations may be possible.

Thus the basic conceptual idea is that it is possible for the scanning agent, that is, the transaction that scans a key-range in an index, to track not only the sequences of pages visited, but also how many of the page accesses require a wait for I/O. When an index scan is reading non-leaf pages to prefetch the index pages, it is also possible to analyze the sequences of pages that will be accessed in order to determine both which prefetching method is desirable, and exactly which pages are (or are not) present in the bufferpool to ensure that only those pages that are actually needed are being read. This evaluation can be done by the index manager component, but it is more commonly done when prefetching is done by the buffer manager component, which can check for bufferpool residency before initiating an I/O on the requested pages.

FIG. 1 shows a schematic diagram of a database system, in accordance with one embodiment. The system (100) includes a client (102), a Database Management System (DBMS) (104), and a Database (106). The client (102) is in electronic communication with the DBMS (104). Typically, the client (102) is a computer system that accesses a service on another computer by some kind of network. In one embodiment, as will be recognized by one of skill in the art, the client (102) may be a computer application, such as a web browser, that runs on a local computer or workstation and connects to the DBMS (104) as necessary. In one embodiment, the client (102) may be a DB2 client available from International Business Machines Corporation (IBM) of Armonk, N.Y. for use in conjunction with one of IBM's line of DB2 information management systems.

The DBMS (104) includes an index manager (108) for managing an index (110). As will be recognized by one of ordinary skill in the art, a DBMS (104) is a computer or server that is running computer software designed for the purpose of managing databases. Typical examples of DBMSs include Oracle, DB2, MicrosoftAccess, Microsoft SQL Server, Postgre SQL, MySQL, FileMaker, and so on. The DBMS (104) is in electronic communication with the client (102) and the database (106). Preferably, the DBMS (104) is a DB2 DBMS from IBM's line of relational DBMSs.

The index manager (108) includes the logic necessary for updating and maintaining the database index (110). As was described above, a database index (110) is typically a data structure that improves the speed of operations in a table. Indexes (110) can be created using one or more columns, providing the basis for both rapid random lookups and efficient ordering of access to records. The disk space required to store the index (110) is typically less than the storage of the table (since indexes usually contain only the key-fields according to which the table is to be arranged, and excludes all other details in the table. In a database (106), an index (110) is typically a copy of part of a table.

The index manager (108) preferably includes the logic necessary to perform the operations necessary to update database indexes (110) on indexable entities. In various embodiments, the index manager (108) may be used on indexes (110) with an arbitrary number of key parts on a wide variety of indexable entities such as XML documents, HTML, tree structures, hierarchical data, unstructured data, and complex data structures generally.

The database (106) includes an index (110) and can be a relational database for storing data that includes indexable entities. As will be recognized by one skilled in the art, a relational database (106) is a database that conforms to a relational model as applied to the format of the database's data and schema. In other words, a relational database (106) is a defined set of relations or tables that is used to organize data into rows and columns.

Figure 2:
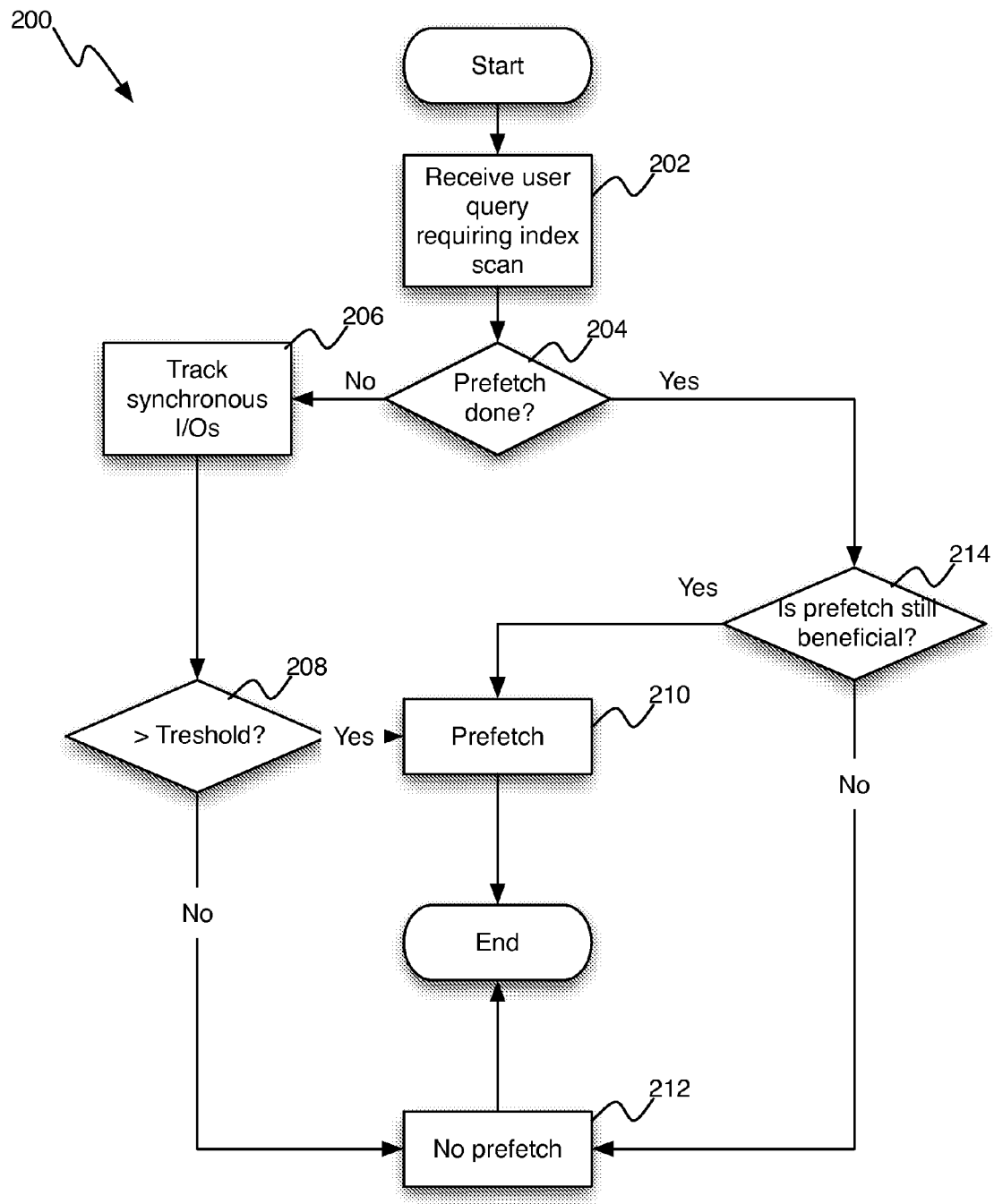
FIG. 2 shows a flowchart of a process for dynamically adjusting index prefetching methods, in accordance with one embodiment.

FIG. 2 shows a flowchart of a process (200) for dynamically adjusting index prefetching methods, in accordance with one embodiment. As can be seen in FIG. 2, the process (200) starts by receiving a user query to the database, which causes the database to scan a range of the database index (step 202). Next, it needs to be determined whether prefetching should be done. In order to make this decision, the process examines whether prefetching is currently being done (step 204). If prefetching is not being done, then the process continues to track how many synchronous I/Os the scanning agent encounters as the scanning agent scans the leaf level (step 206). This tracking typically be done by getting feedback after every GETP (i.e. request by the scanner to access a page) request to indicate whether a synchronous wait occurred or not.

Next it is determined whether the number of synchronous waits for I/O exceeds a predetermined threshold number (step 208). If the threshold value is exceeded, this indicates that it likely is beneficial for the scanning agent to begin using a prefetching method (step 210). If the threshold is not exceeded in step 208, then it indicates that the index scan is performing adequately and that there is no need to begin using prefetching (step 212). The exact determination of what the 'threshold' in step 208 is to start triggering the prefetching can be variable and, for example, be based upon the CPU expense of initiating prefetching, as well as the I/O characteristics of the device (i.e. spinning disk vs. solid state, etc.). In a general sense, the cost of generating the prefetches (regardless of the method) is weighed against the expected benefit to determine if prefetching is beneficial. Many techniques for doing this can be envisioned by those of ordinary skill in the art. Furthermore, it should be realized that while block 208 refers to a threshold number, the threshold may also of course be based on a percentage of accesses, rather than an absolute number, in various embodiments.

Returning now to step 204, if it is determined that prefetching is currently being done, it is still desirable to track how the I/O is behaving to determine whether the prefetching is still beneficial, or alternately whether a different method of prefetch might be better than the current one. For example, if sequential prefetching is being used and pages are still missing from the bufferpool, then it may be desirable to switch to a non-leaf to leaf prefetching method.

Typically, when prefetching is being done, a request is issued to the buffer manager component to pre-read a range or list of pages. It is possible for these prefetching methods to give 'feedback' to indicate how many pages that are being requested are already resident in the bufferpool. The process can therefore determine whether prefetching still is beneficial (step 214). For example, in one embodiment the process can examine the bufferpool to see if most of the pages from the most recent prefetch are already in the bufferpool. If that is the case, then it is likely that the prefetching is no longer beneficial and should be disabled and the process continues to step 212, where prefetching is disabled. Otherwise, if synchronous waits are still being avoided by doing the prefetching, then the prefetching should continue as it is benefitting the transaction, and the process continues to step 210. This process is continuously repeated, as various objects are requested. It should be noted that in some embodiments, a single 'bad' prefetch that is not beneficial will not necessarily cause the prefetch to cease. For example, there may be cases where it may be beneficial to wait for several 'bad' prefetches, as an unnecessary prefetch has a low CPU cost, whereas a missed prefetch would cost significantly more in elapsed time.

It should be noted that there are variations on this approach as well. For example, in some embodiments, it is possible that sequential prefetching processes may actually request more pages than are actually accessed. In other embodiments, the only pages that are tracked are ones that are subsequently accessed via GETP (Get Page) command by the scanning agent. Such an approach may be more accurate, but also requires a higher overhead, since the tracking algorithm would have to 'remember' which pages were requested by the prefetching to determine how effective it was.

With both of these methods, it is possible for the scanner to track "recent" accesses and determine how they are behaving. As the skilled person realizes, there are many ways to define 'recent' and these decisions can be made in many ways (i.e., trading off fast adaptability against occasional incorrect decisions). It is even possible for statistics (including real-time stats) to reflect the 'variability' of clustering throughout a particular tree to indicate when finer vs. coarser grained decision-making is warranted.

For example, in one embodiment "recent" can refer to most recent page accesses for this transaction for this object. For example, if 5 out of 16 of the last accesses were not present in the bufferpool, it might be desirable to try more aggressive prefetch methods. An example of statistical usage is the detection of the variance of clustering statistics for different parts of the index. For example, if the clustering in different parts of the index varied a lot, finer grained tracking of the transaction could be used (i.e. track more closely so the prefetch methods can be switched more rapidly). On the other hand, if the clustering is uniform, then it is less likely that the prefetch methods need to be changed as often and a less "aggressive" approach can be taken for the tracking. Even without statistics, a scanning transaction can detect how much it "changes its mind" on prefetching methods to adjust on the fly how closely the scanning transaction tracks the prefetching. In some embodiments, the "closeness" of the tracking is largely just an adjustment to how many of the most recent accesses are examined in determining which prefetch method to use.

As was discussed above with respect to FIG. 2, also with these alternative methods, the exact thresholds used will be variable based upon the operating environment for the index scan. Some of the factors that can be considered in making decisions about thresholds include page access speeds (i.e. device types and characteristics), system loading (including bufferpool loading), CPU overhead required, bufferpool sizes, user switches (i.e. parameters to help decisions about CPU vs. I/O tradeoffs), and effectiveness of the prefetching when it is being done. Simple heuristics can be used that will provide benefits (i.e., prefetching if there has been many recent waits for I/Os).

Once it is determined that prefetching is desirable, it is also possible for the scanning agent to determine which method of prefetching is desirable. For example, if the transaction is doing non-leaf→leaf prefetching, it is possible for the scanning agent to determine how well a sequence of pages is clustered. In some embodiments, the buffer manager component could also make these decisions when presented with a list of pages. If the sequence of pages is well ordered and there is a benefit to sequential prefetching on the system, the scanning agent can decide to begin using sequential prefetching. For page sequences that are not well ordered, the scanning agent can use other prefetching methods, such as non-leaf→leaf prefetching or list prefetching, as is well known to those of ordinary skill in the art. The determination of which prefetching method to use can be made, for example, by tracking jumps between successive page accesses. For example, if there is only a jump of one or two pages between accesses, then sequential prefetching might be good, whereas if there are jumps involving many pages between accesses, a list-based prefetching method might be better. Various types of threshold values can be established to make such decisions, as can be envisioned by those of ordinary skill in the art.

It should be noted that as other prefetching methods are established, it is possible for the scanning agent to 'cost' the expense of a particular prefetching method versus the benefits for the pages being encountered. Such 'costing' can be complex or heuristic based, but the basic idea is that by tracking the sequence of pages accessed and the available access methods (including possibly the underlying physical devices/storage systems and their behaviors) the agent can dynamically change the prefetching method to best suit the conditions of the portion of the tree being scanned.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A computer-implemented method for performing an index scan in a database system, the method comprising:
   dynamically tracking a sequence of pages visited during an index scan, wherein the tracking includes:
      tracking a total number of pages visited during an index scan,
      tracking a number of page accesses requiring a wait for input or output, and
      determining a percentage of page accesses requiring a wait for input or output;
   comparing the percentage of page accesses requiring a wait for input or output to a threshold value;
   in response to determining that the percentage of pages requiring a wait for input or output exceeds the threshold value, selecting a prefetching method among a set of available prefetching methods;
   continuously tracking a sequence of pages accessed and available access methods; and
   dynamically selecting a different prefetching method from the set of available prefetching methods in response to detecting that the different prefetching method provides reduced scanning time compared to the currently selected prefetching method for a portion of the index that is being scanned.

2. The method of claim 1, wherein the prefetching methods include one or more of: sequential prefetching, index non-leaf to leaf prefetching, index parent non-leaf to child non-leaf prefetching, and index leaf to data page prefetching.

3. The method of claim 1, wherein the different prefetching method is a prefetching method that provides reduced prefetching time, given clustering and bufferpool residency characteristics of the current portion of the index tree, compared to the currently selected prefetching method.

4. The method of claim 1, further comprising:
   when the index scan reads non-leaf pages to prefetch index pages, analyzing the sequences of pages that will be accessed; and
   determining which pages are present in the bufferpool to ensure that only those pages that are needed are being read.

5. The method of claim 1, wherein dynamically tracking a sequence of pages includes:

receiving feedback after every request from an index scanner to access a page as to whether a synchronous wait occurred or not.

6. The method of claim 1, wherein the selection of a prefetching method is further determined at least in part based on one or more of the following factors: page access speeds, system loading including bufferpool loading, CPU overhead required, bufferpool sizes, bufferpool loading, device loading, user switches, and time required for the prefetching when prefetching is being done.

7. A computer program product for performing an index scan in a database system, the computer program product comprising:
a non-transitory computer readable storage medium having computer readable program code embodied therewith, the computer readable program code comprising:
computer readable program code configured to dynamically track a sequence of pages visited during an index scan, wherein the tracking includes:
tracking a total number of pages visited during an index scan,
tracking a number of page accesses requiring a wait for input or output, and
determining a percentage of page accesses requiring a wait for input or output;
computer readable program code configured to compare the percentage of page accesses requiring a wait for input or output to a threshold value;
computer readable program code configured to in response to determining that the percentage of pages requiring a wait for input or output exceeds the threshold value, select a prefetching method among a set of available prefetching methods;
computer readable program code configured to continuously track a sequence of pages accessed and available access methods; and
computer readable program code configured to dynamically select a different prefetching method from the set of available prefetching methods in response to detecting that the different prefetching method provides a shorter scanning time compared to the currently selected prefetching method for a portion of the index that is being scanned.

8. The computer program product of claim 7, wherein the prefetching methods include one or more of: sequential prefetching, index non-leaf to leaf prefetching, index parent non-leaf to child non-leaf prefetching, and index leaf to data page prefetching.

9. The computer program product of claim 7, wherein the different prefetching method is a prefetching method that provides reduced prefetching time, given clustering and bufferpool residency characteristics of the current portion of the index tree, compared to the currently selected prefetching method.

10. The computer program product of claim 7, further comprising computer readable program code configured to:
analyze the sequences of pages that will be accessed when the index scan reads non-leaf pages to prefetch index pages; and
determine which pages are present in the bufferpool to ensure that only those pages that are needed are being read.

11. The computer program product of claim 7, wherein the computer readable program code configured to dynamically track a sequence of pages includes:
computer readable program code configured to receive feedback after every request from an index scanner to access a page as to whether a synchronous wait occurred or not.

12. The computer program product of claim 7, wherein the selection of a prefetching method is further determined at least in part based on one or more of the following factors: page access speeds, system loading including bufferpool loading, CPU overhead required, bufferpool sizes, bufferpool loading, device loading, user switches, and time required for the prefetching when prefetching is being done.

* * * * *